United States Patent [19]

Toby

[11] 3,991,630

[45] Nov. 16, 1976

[54] VARIABLE FEED DRIVE MECHANISM

[75] Inventor: Daniel J. Toby, South San Francisco, Calif.

[73] Assignee: Toby Enterprises, South San Francisco, Calif.

[22] Filed: Sept. 26, 1974

[21] Appl. No.: 509,472

[52] U.S. Cl. .......... 74/117
[51] Int. Cl.[2] .......... F16H 29/04
[58] Field of Search .......... 74/117

[56] References Cited

UNITED STATES PATENTS

| | | | |
|---|---|---|---|
| 3,071,990 | 1/1963 | Uhtenwoldt | 74/117 |
| 3,213,697 | 10/1965 | Hartmann et al. | 74/117 |
| 3,512,423 | 5/1970 | Schuitemaker | 74/117 |

*Primary Examiner*—Samuel Scott
*Assistant Examiner*—Wesley S. Ratliff, Jr.
*Attorney, Agent, or Firm*—Harris Zimmerman

[57] ABSTRACT

A variable feed drive mechanism comprises a novel linkage for delivering an adjustable amount of motion from a reciprocating drive lever to a unidirectional clutch output mechanism. A first linking member is pivotally joined to the distal end of the reciprocating lever and disposed substantially perpendicular thereto. An adjustment lever is joined at one end to a fixed pivot, and a second linking member is pivotally joined at one end to a distal portion of the adjustment lever, and at the other end to the distal end of the first linking member. A third linking member is pivotally joined at one end to an arm extending from the ratchet-clutch mechanism, and is pivotally joined at the other end to the junction of the first and second linking members. The ratchet-clutch, fixed pivot, and drive lever are arrayed in a triangle, with the adjustment lever extending into the triangle, so that rotation of the adjustment lever toward the drive lever increases the amount of motion transmitted to the ratchet-clutch mechanism.

12 Claims, 9 Drawing Figures

FIG _ 1
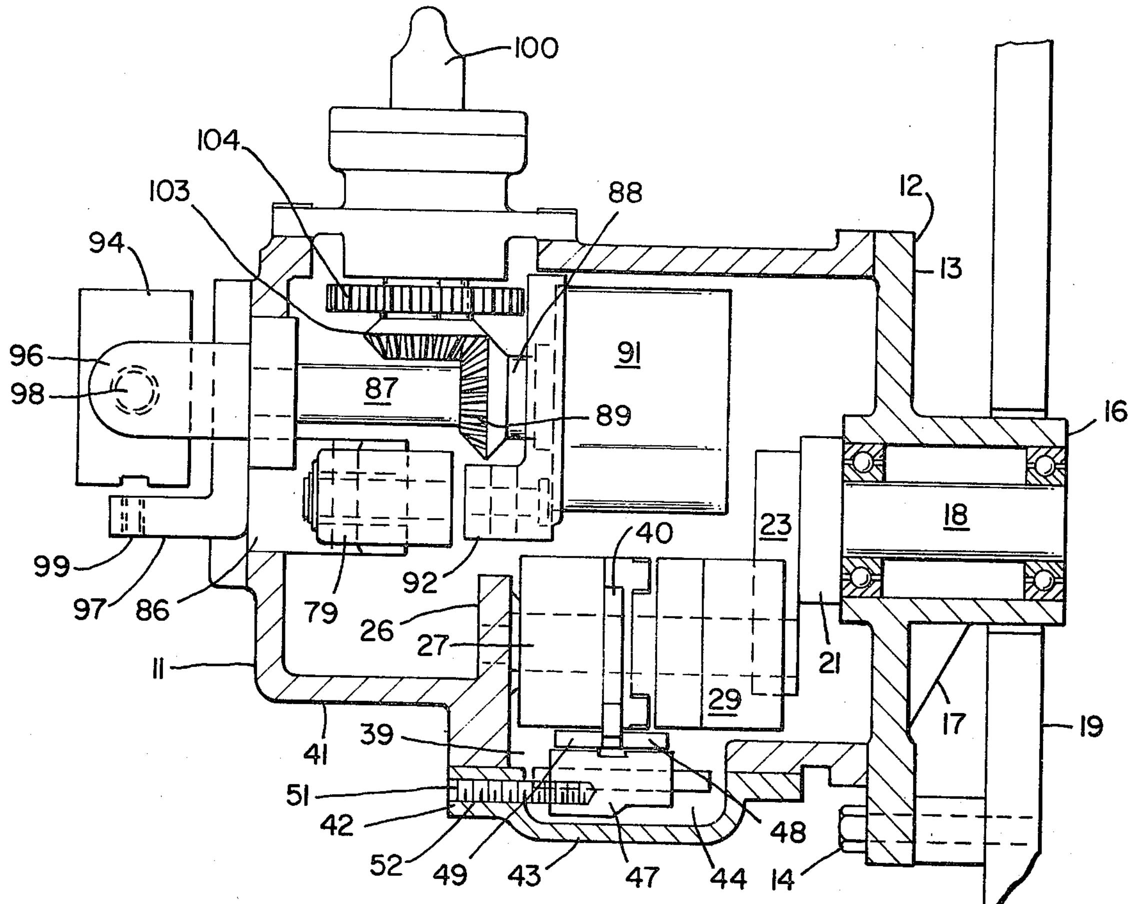
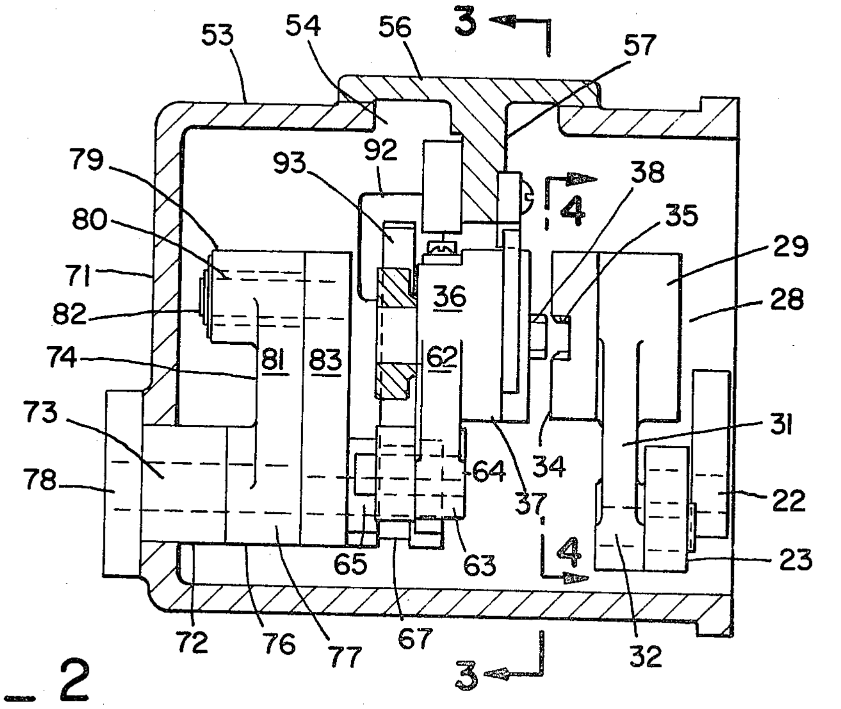
FIG _ 2

VARIABLE FEED DRIVE MECHANISM

BACKGROUND OF THE INVENTION

In the field of food processing, machines manufactured for the purpose of slicing such comestible products as meat, luncheon meat, cheese, and the like generally comprise a blade and blade drive mechanism, a product infeed mechanism and control therefor, and a sliced product receiving mechanism. The use of modern packaging techniques, wherein the package is weight-marked and priced before being filled, demand that the control of slice thickness be very accurate, since the product density and diameter, as well as the number of slices per package, is not an easily controlled variable. Therefore, the product infeed mechanism, which controls the slice thickness, must be easily and quickly variable, as well as constant when fixed at a particular setting.

Ideally, the infeed mechanism should have a positive feed action, as opposed to gravity feed or spring-biased feed, which oscillates synchronously with the blade. That is, the product should be fed into the path of the blade when the blade is out of the way, and then held stationary while the blade passes through the product. Also, the infeed motion should be steplessly adjustable while the machine is in operation, to permit easy machine set-up and adjustment without frequent shutdowns. This feature would also permit the slicer to be programmed to make a group of slices, then idle while the receiving mechanism moves the group out of the way.

In the prior art the product infeed mechanisms of comestible product slicers suffer from certain disadvantages which depart substantially from the ideals set forth. They are, in general: 1 The uniformity of the output is poor because the infeed mechanisms rely on springs, which can overload at high cutting rates and fail to properly control the slice thickness; 2 The adjustment of the feed control latch is tricky, especially on a new machine. Thus, servicing is frequently required and demonstrations of new machines are unimpressive to new customers when the proper adjustments cannot be made quickly.

SUMMARY OF THE INVENTION

The present invention provides a novel approach to the feeding of a product into a slicer. It includes a notched lever mounted pivotally on a shaft and driven reciprocally through an acute angle by an eccentric pin on a constantly rotating crank. Adjacent to the notched lever is a similar toothed lever pivotally and slidably secured on the same shaft. A pair of rollers impinge on the toothed lever and control its lateral position on the shaft, so that the toothed lever may be moved into and out of engagement with the notched lever, thereby controlling whether the oscillating motion of the notched lever is transmitted to the remainder of the feed mechanism.

Joined to the toothed lever is a novel linkage which transmits an adjustable amount of the reciprocating motion to a unidirectional clutch output mechanism which in turn drives the comestible product into the path of the cutter blade. The linkage includes a first linking member pivotally joined to a shaft extending from the distal end of the toothed lever. The first linking member is disposed generally normally to the toothed lever, and has pivotally secured thereto a second linking member joined to the distal end thereof. An adjustment lever is provided, pivotally joined to a distal portion of the adjustment lever, and a third linking member is pivotally joined between the distal end of the first linking member and the arm of the clutch mechanism.

The adjustment lever provides a means of steplessly varying the amount of reciprocating motion reaching the clutch arm from the toothed lever by varying the geometrical disposition of the linking members. With the adjustment lever in the zero-transfer (zero feed) position, the second and third linking members are substantially colinear, and are incapable of transferring the motion of the first linking member to the ratchet-clutch arm. Rotation of the adjustment lever toward the maximum transfer (maximum feed) position causes the second and third linking members to diverge from co-linearity, which in turn increases the amount of reciprocating motion transferred to the clutch arm.

THE DRAWING

FIG. 1 is a top sectional view of the variable feed mechanism of the present invention.

FIG. 2 is a front sectional view of the invention as seen in FIG. 1.

DESCRIPTION OF THE PREFERRED EMBODIMENT

The present invention generally comprises a product-infeed mechanism for a comestible product slicer or the like which provides a means of steplessly adjusting the amount of product fed to the slicer, as well as a means for interrupting the product feed without affecting the setting of the adjustment means. Although the invention is described in relation to its use in a slicer, it will be appreciated that the invention may have broader applications, and the scope of the invention is not limited to the slicer environment.

Figure 3:
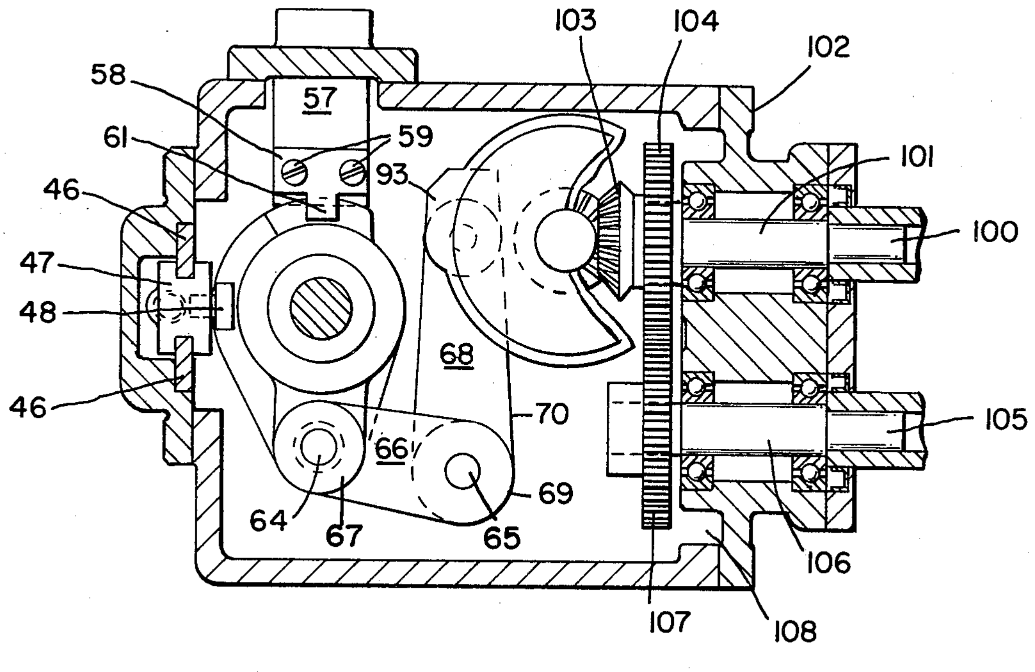
FIG. 3 is a sectional view of the variable linkage portion of the feed drive, taken along line 3—3 of FIG. 2.

With reference to FIGS. 1-3, the product infeed mechanism includes a housing 11 which is sealable to completely enclose the mechanism to keep it free from dirt and contamination. One end 12 of the housing is sealed by a plate 13 joined thereto. The plate 13 is provided with a centrally disposed journal 16 extending outwardly therefrom and reinforced with a plurality of webs 17. Extending through the journal is a drive shaft 18 on which is mounted an external pulley 19. The pulley receives a drive belt which is driven by a constantly rotating power source, such as an electric motor or the like.

Secured to the interior end of the drive shaft 18 is a crank 21 which includes an eccentric pin 22 protruding therefrom parallel to the drive shaft. A linking member 23 has one end 24 pivotally secured to the eccentric pin 22. Within the housing a shoulder extending inwardly therefrom includes a journal 26 which supports a shaft 27 parallel to the drive shaft. A drive lever 28 includes a cylindrical portion 29 through which an aperture extends, pivotally receiving the shaft 27 therethrough. A web 31 extending normally from the cylindrical portion 29 includes a hole therethrough which pivotally receives a pivot pinn 32. A similar hole in the end 33 of the linking member 23 also pivotally receives the pivot pin 32.

The cylindrical portion 29 of the driving lever is provided with a pair of radially opposed notches 35 in one annular face 34 thereof. A driven lever 36 similar to the driving lever is freely mounted on the shaft 27 adjacent to the annular face 34. The driven lever includes a cylindrical portion 37 which is provided with a pair of radially opposed teeth 38 extending toward the driving lever and dimensioned to be removably received in the notches 35. The cylindrical portion 37 of the driven lever also includes an annular shoulder 40 extending radially therefrom.

An opening 39 in the front wall 41 of the housing is sealed by a shifting mechanism 42 bolted thereto. With reference to FIGS. 1 & 3, the shifting mechanism includes a removable plate 43 having an inwardly opening cavity 44 therein. A pair of parallel rail members 46 are secured laterally to opposed interior edges of the cavity 44. A shuttle 47 has lateral opposed grooves which slidably receive the rail members 46 and permit the shuttle to slide laterally. Extending from the interior surface of the shuttle are a pair of laterally opposed rollers 48 and 49 which receive therebetween and impinge on the annular shoulder 40 of the driven lever. A rod 51 freely extends through a lateral aperture 52 in the plate 43, and is secured to the shuttle. The rod is joined externally to a pneumatic cylinder or the like to selectively translate the shuttle along the rail members. Such translation will cause the rollers of the shuttle to urge the driven lever toward or away from the driving lever.

The top surface 53 of the housing includes a hole 54 which is sealed by a removable plate 56 bolted thereto. The plate is provided with an inwardly extending arm 57, the end of which is disposed near the driven lever. A plate 58 secured to the end of the arm 57 by screws 59 includes a stop tab 61 depending therefrom which extends into the path described by the annular shoulder 40 when the driven lever is translated by the shifting mechanism. The stop tab acts by its presence to limit the translation of the driven lever away from the driving lever.

The driven lever 36 includes a web 62 extending normally from the cylindrical portion 37, with a hole 63 in the distal end thereof fixedly receiving a pivot shaft 64. A linking bar 66 includes a hole in one end 67 thereof through which the pivot shaft 64 is rotatably received. The linking bar 66 includes a clevis end 69 with aligned holes therethrough receiving a pivot shaft 65 in freely pivotting fashion. The end 70 of a linking bar 68 is straddled by the opposed tires of the clevis 69 and the pivot shaft 65 extends through a hold in the end 70.

The end wall 71 of the housing includes a journal 72 extending inwardly which rotatably supports a pivot shaft 73. An adjustment lever 74 includes a lower cylindrical portion 76 which has an aperture 77 extending axially therethrough. The pivot shaft is fixedly secured in the aperture 77, so that rotation of the pivot shaft at its external end 78 by manual or mechanical means causes rotation of the adjustment lever. The adjustment lever includes an upper cylindrical portion 79 joined to the lower portion by a web 81. A pivot shaft 82 is freely secured in a bearing 80 extending axially through the upper cylindrical portion 79. A linking bar 83 is provided with a hole in the upper end thereof which receives the pivot shaft 82 in a fixed manner. The lower end of linking bar 83 includes a hole which receives the pivot shaft 65 therethrough in fixed fashion.

The end wall 71 of the housing is also provided with a hole 86 through which a shaft 87 extends into the housing. The interior end 88 of the shaft 87 supports a bevel gear 89 and a unidirectional clutch mechanism 91. The clutch 91 includes a pivot lug 92 extending parallel to the shaft 87, to which is rotatably joined the end 93 of linking bar 68. The external end of the shaft 87 supports a drum 94. A pair of arms 96 and 97 extend normally from the end wall and perpendicular to each other. Screw means received in threaded holes 98 and 99 support a brake pad (not shown) which impinges on the cylinder with a force adjustable by the screw means.

An output shaft 100 is supported by a main bearing 101 secured in a plate 102. A bevel gear 103 is disposed on the interior end of the outpupt shaft 100, engaging the bevel gear 89, and a drive gear 104 is also secured on the output shaft 100. An output shaft 105, parallel to shaft 100 is supported in the plate 102 by a main bearing 106. The shaft 105 supports a drive gear 107 which engages drive gear 104, causing shaft 105 to counterrotate with respect to shaft 100. The plate 102 is bolted to the housing, sealing the opening 108 through which the output shafts extend.

OPERATION OF THE PREFERRED EMBODIMENT

Figure 4:
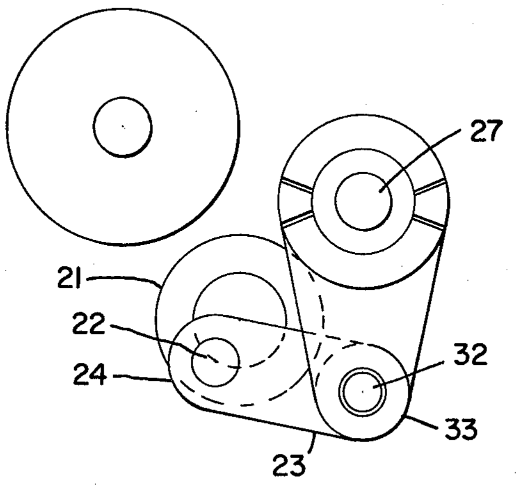
FIG. 4 is a sectional view of the drive lever portion of the invention, taken along line 4—4 of FIG. 2.
Figure 5:
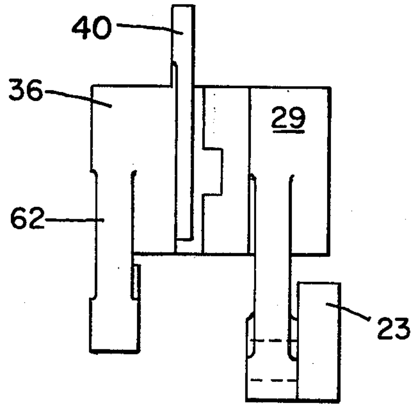
FIG. 5 is a front elevation of the drive lever mechanism engaged with the toothed lever.

The drive shaft 18 is driven in constant rotation by an external power source, and the eccentric pin on the crank 21 imparts an oscillating translational motion to the linking member 23 as may be seen in FIG. 4. The motion of the linking member 23 causes the drive lever to rotate in an oscillating manner through an angle of 33° on the shaft 27. The drive lever and driven lever 36 form an oscillating clutch device which is controlled by the shifting mechanism 42. The shifting mechanism selectively urges the driven lever toward the drive lever, the teeth of the driven lever engaging the notches of the driving lever and causing the levers to oscillate together, as shown in FIG. 5. The shifting mechanism may be actuated at any time to disengage the two levers.

Figure 6:
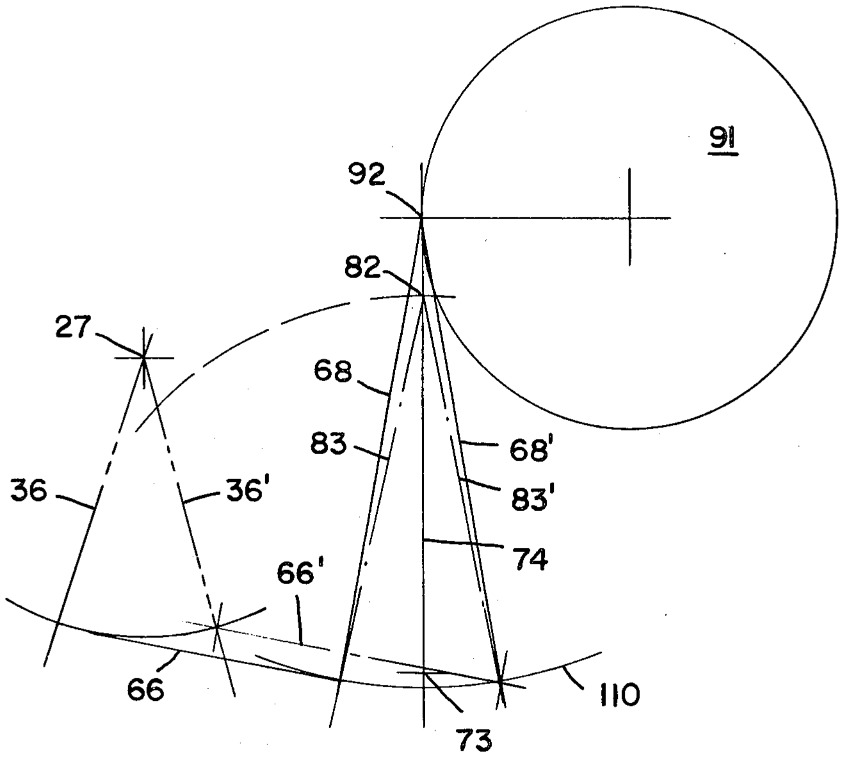
FIG. 6 is a diagrammatic representation of the dynamic relationships of the linking members in the zero feed position.
Figure 7:
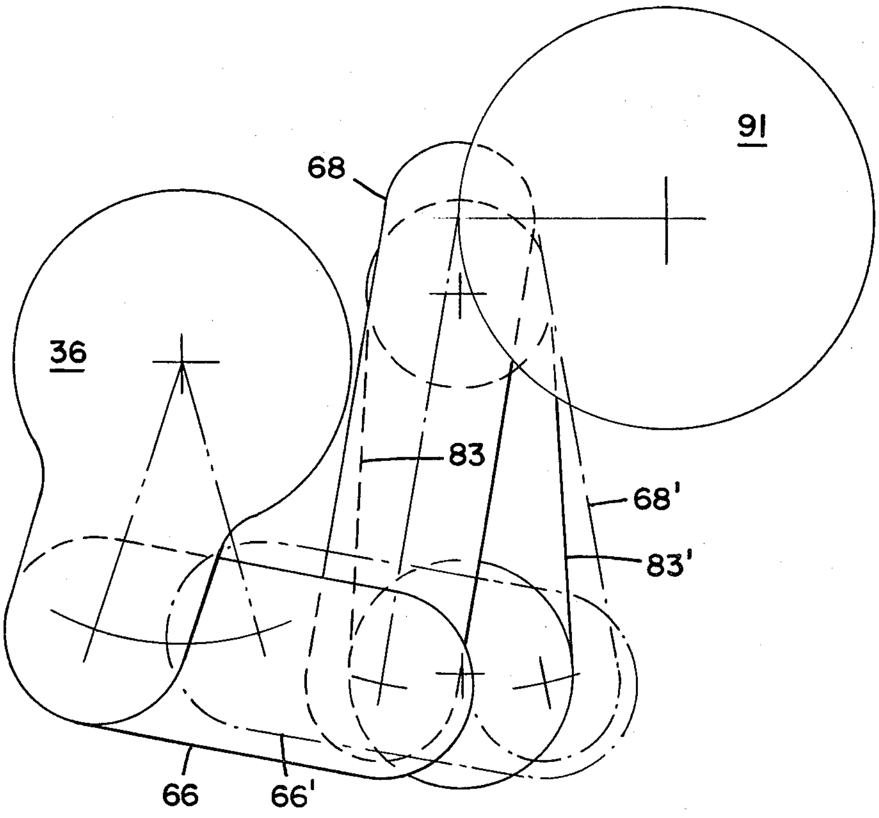
FIG. 7 is a schematic view of the linking members in the zero feed position.

With the driven lever and drive lever engaged, the driven lever 36 also oscillates through an angle of 33°. As shown in FIGS. 6 through 9, a selected portion of this oscillating motion may be transmitted to the unidirectional clutch 91 through linking members 66, 68 and 83, according to the angle at which adjustment lever 74 is disposed. As shown in FIGS. 6 and 7, when the adjustment lever is rotated toward the unidirectional clutch 91, linking bars 68 and 83, pivotting on points 92 and 82 respectively, are substantially parallel as they oscillate to positions 68' and 83'. The linking bar 66 which is pivotally joined to their distal ends transmits the oscillating motion thereto from the driven lever, the distal ends describing substantially the same arc 110 which is determined by the linking bar 83. In this disposition of the linkage, termed the zero feed or zero transfer disposition, no force is transmitted linearly along the link 68 tangential to the clutch 91. Therefore, the clutch is not rotated at all, and there is no output motion at shafts 100 and 105.

Figure 8:
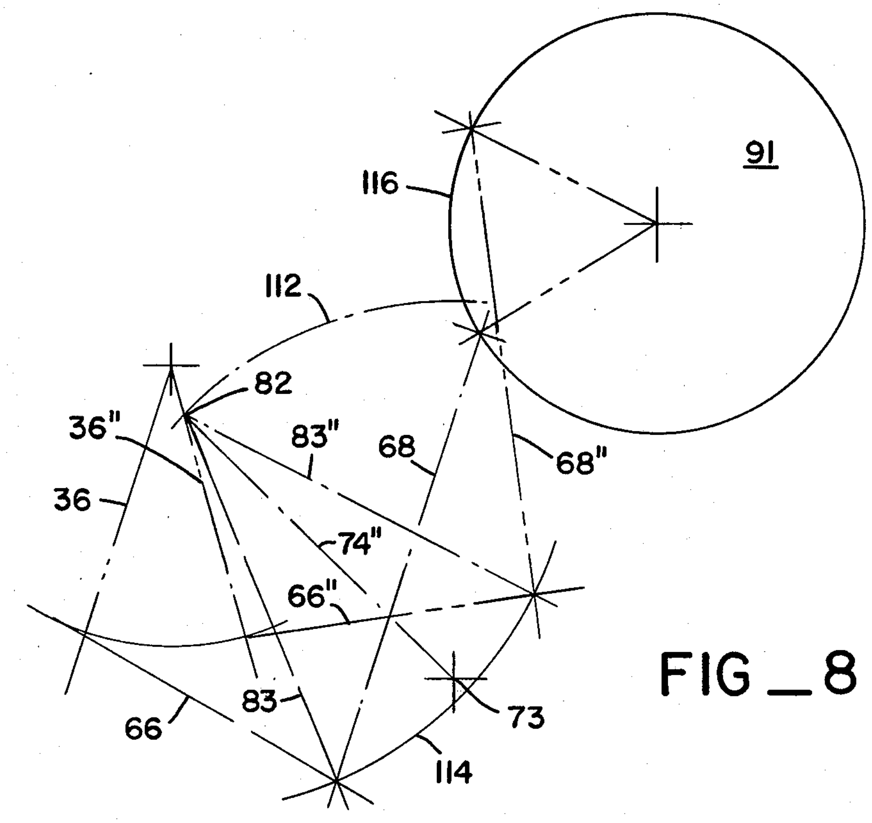
FIG. 8 is a diagrammatic representation of the dynamic relationships of the linking members in maximum feed disposition.

When the adjustment lever 74 is rotated counterclockwise on shaft 73 from the position in FIG. 6 to the position in FIG. 8, the geometry of the linkage is changed to permit transfer of oscillating motion to the unidirectional clutch 91. The pivot point 82 describes an arc 112, and the linking bars 68 and 83 are no longer parallel. Linking bar 66 is driven by the motion of lever 36 to 36'', the distal end of bar 66 describing an arc 114 whose radius and center is still determined by the linking bar 83 as it pivots about shaft 82 to position 83''. The motion of the distal end of link 66 along arc 114 causes link 68 to translate to position 68'', since it is pivotally joined to that end of link 66. As link 68 moves to and from 68'', it imparts substantial tangential motion to the unidirectional clutch 91, which is driven in oscillating fashion through an arc 116. This motion of clutch 91 is converted to a periodic unidirectional output which is transferred through the bevel gears 89 and 103 to the output shafts.

Figure 9:
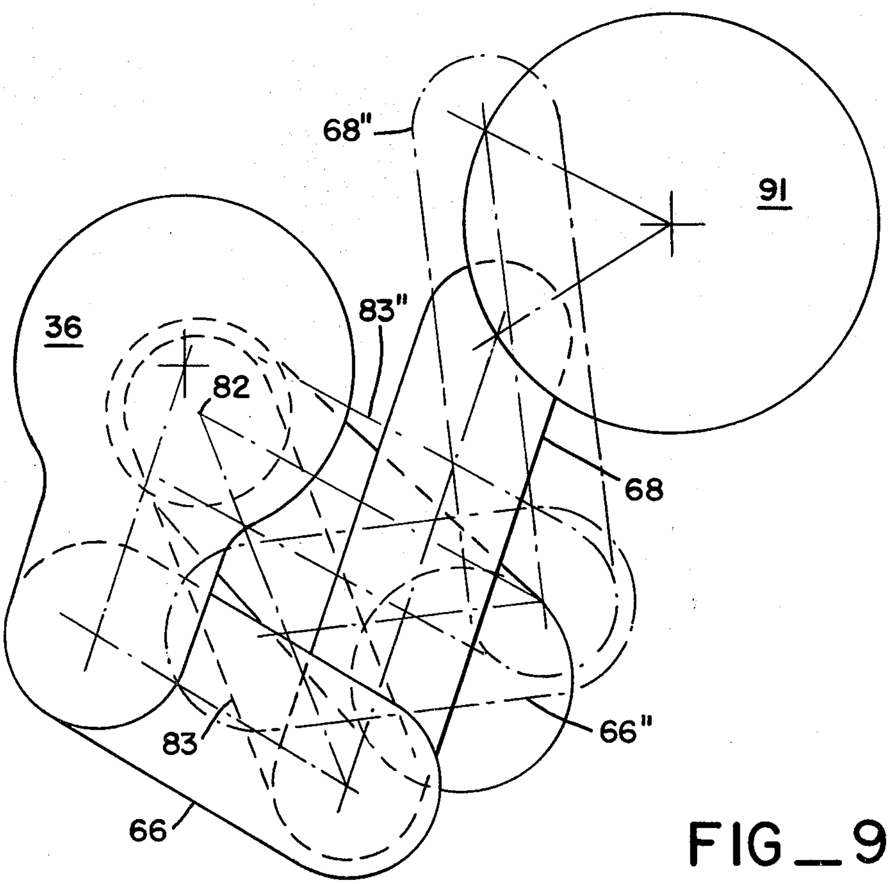
FIG. 9 is a schematic view of the linking members in the maximum feed position.

The position of the adjustment lever shown in FIGS. 8 and 9 at 74'' yields the maximum transfer of motion to the clutch 91, and is termed the maximum feed position. It may be appreciated that positions of the adjustment lever intermediate those depicted in FIGS. 6 and 8 will yield intermediate amounts of motion transfer, and that arc 112 therefor represents a stepless continuum of motion transfer from zero (FIG. 6) to maximum (FIG. 8). The output shafts 100 and 105 may be joined to a product infeed mechanism of a slicing machine by a chain or belt drive as is commonly known in the art. To prevent overcoasting of the output shafts, the brake pad mounted on arms 97 and 98 frictionally engages the cylinder 94 in adjustable fashion.

It should be noted that the present invention has these advantages over prior art infeed mechanisms: 1 the feed drive is positive, using no springs or cam-follower arrangements; 2 the output is steplessly adjustable from zero to maximum while it is running; 3 the shifting mechanism may be actuated at any time to interrupt the feed drive without affecting the setting of the adjustment lever; 4 the positive nature of the feed drive enables much higher speeds than could previously be attained; 5 the drive lever — driven lever assembly requires no critical adjustment; 6 the sealed modular housing affords greater cleanlines and more efficient lubrication; and 7 the feed output is uniform, assuring uniform slice thickness.

I claim:

1. A variable drive mechanism, comprising: oscillating means driven in drive oscillating motion; unidirectional clutch means for converting oscillating motion to unidirectional rotational motion; linkage means including a plurality of linking members drivingly extending between said oscillating means and said unidirectional clutch means for transferring the drive oscillating motion to said unidirectional clutch means; adjustment means for varying the angular relationships of said linking members to adjust the amount of said drive oscillating motion transferred thereby; said linkage means including a first linking member pivotally secured at one end to said oscillating means, an adjustment lever pivotally jointed at one end to a fixed pivot, a second linking member pivotally joined at one end to the other end of said adjustment lever, the other end of said second linking member being pivotally joined to the other end of said first linking member, a third linking member pivotally joined at one end to said unidirectional clutch means; and the other end of said third linking member is pivotally secured to at least one of the other end of said first linking member and the other end of said second linking member.

2. The variable drive mechanism of claim 1, wherein the other end of said third linking member is pivotally secured to the other end of said first linking member.

3. The variable drive mechanism of claim 1, wherein said oscillating means includes a first lever freely secured on a first shaft.

4. The variable drive mechanism of claim 3, further including a second lever rotatably disposed on said first shaft and clutch means to selectively transmit oscillating rotational motion to said first lever from said second lever.

5. The variable drive mechanism of claim 4, wherein said second lever includes an annular surface about said first shaft and perpendicular thereto and at least a pair of radially disposed notches disposed in said annular surface.

6. The variable drive mechanism of claim 5, wherein said first lever includes at least a pair of radially opposed teeth extending toward said second lever and adapted to engage said notches.

7. The variable drive mechanism of claim 4, including a shifting mechanism for translating said first lever laterally along said shaft.

8. The variable drive mechanism of claim 7, wherein said shifting mechanism includes a shuttle mounted on laterally disposed rail members.

9. The variable drive mechanism of claim 8, wherein said shuttle includes a pair of spaced rollers adapted to receive portions of said first lever therebetween.

10. The variable drive mechanism of claim 7, including stop means for limiting translation of said first lever away from said second lever.

11. An oscillating clutch mechanism, comprising a first lever rotatably mounted on a shaft and driven at constant, reciprocating rotational motion, said first lever including a pair of notches radially opposed with respect to said shaft, a second lever freely mounted on said shaft and including a pair of opposed teeth extending toward said first lever and adapted to engage said notches, and means for laterally translating said second lever along said shaft into and out of engagement with said first lever.

12. The oscillating clutch mechanism of claim 11, wherein said means comprises a shuttle slidably mounted on laterally disposed rail members, said shuttle including a pair of opposed rollers adapted to engage therebetween portions of said second lever.

* * * * *